United States Patent [19]

O'Brien

[11] Patent Number: 4,534,020
[45] Date of Patent: Aug. 6, 1985

[54] APPARATUS AND METHOD FOR DETECTING SEISMIC WAVES

[75] Inventor: John T. O'Brien, Bartlesville, Okla.

[73] Assignee: Phillips Petroleum Company, Bartlesville, Okla.

[21] Appl. No.: 313,037

[22] Filed: Oct. 19, 1981

[51] Int. Cl.³ .............................................. G01V 1/16
[52] U.S. Cl. .................... 367/188; 181/401; 367/911
[58] Field of Search ...................... 367/25, 35, 86, 182, 367/188, 911; 181/102, 105, 108, 401; 310/340, 348; 175/50; 73/644, 652

[56] References Cited

U.S. PATENT DOCUMENTS

| | | | |
|---|---|---|---|
| 1,980,993 | 11/1934 | Hayes | 367/178 |
| 2,049,236 | 7/1936 | Weatherby | 181/401 |
| 2,073,493 | 4/1936 | Salvatori | 181/401 |
| 2,428,168 | 9/1947 | Loper | 181/401 |
| 2,755,879 | 7/1956 | Widess | 181/401 |
| 3,048,235 | 8/1962 | Itria | 181/0.5 |
| 3,056,463 | 10/1962 | Summers | 367/912 |
| 3,208,549 | 9/1965 | Alxander et al. | 367/25 |
| 3,332,057 | 7/1967 | Pavey | 367/182 |
| 3,360,772 | 12/1967 | Massa | 367/188 |
| 3,445,809 | 5/1969 | McLoad | 367/188 |
| 3,608,251 | 8/1972 | Morris | 367/188 |
| 3,872,478 | 3/1975 | Lucole | 346/7 |
| 3,931,453 | 1/1976 | Hall | 367/1188 |
| 3,932,834 | 1/1976 | Sutherland | 181/122 |
| 3,963,093 | 6/1976 | Morris | 181/108 |
| 4,078,223 | 3/1978 | Strange | 367/178 |
| 4,117,449 | 9/1978 | McNeel | 367/188 |
| 4,246,652 | 1/1981 | Khan et al. | 367/42 |
| 4,300,220 | 11/1981 | Goff | 181/401 |

FOREIGN PATENT DOCUMENTS

| | | | |
|---|---|---|---|
| 0958109 | 11/1974 | Canada | 367/188 |
| 1451524 | 7/1966 | France | 181/401 |
| 2446494 | 9/1980 | France | 367/188 |
| 11499 | of 1886 | United Kingdom | 181/122 |
| 152963 | 10/1963 | U.S.S.R. | 367/188 |

OTHER PUBLICATIONS

Vinugraslov, F. V., "Nekotarye . . . ", 1967, pp. 141-145, Nedra (Moscow).
Hardy, H. R., "Evaluating the Stability . . . Acoustic Emmission", 1/18/74, pp. 80-105, Conf. Mont. Struc. Inbg., F. L. Fla.
Coffeen, "Seismic Exploration Fundamentals", 1978, pp. 80-81, Petroleum Pub. Co., Tulsa, OK.

Primary Examiner—Nelson Moskowitz
Attorney, Agent, or Firm—John R. Casperson

[57] ABSTRACT

Disclosed is an apparatus for transducing seismic signals and a method for placing said apparatus for detecting seismic signals. The apparatus comprises at least one geophone preferably embedded in a polymeric material contained in a tubular member. A lower portion of the tubular member preferably contains ballast. The tubular member is preferably cemented into a borehole.

5 Claims, 1 Drawing Figure

APPARATUS AND METHOD FOR DETECTING SEISMIC WAVES

BACKGROUND OF THE INVENTION

The invention relates to seismology. In one aspect, the invention relates to an apparatus usefully employed to detect seismic phenomenon. In another aspect, the invention relates to a method for positioning an apparatus for the detection of seismic phenomenon.

The "seismic signal" is the sound that is initiated at the surface and propagates into the earth. It is distinguished from the "seismic response" that is reflected to the surface. The signal sound is characterized by the source producing it. It can be measured by putting a geophone near the source and recording the sound as it leaves. This recording is called the "signature" of that source. The signature shows what wavelet was introduced into the ground, whereas the record section shows what wavelet is returned to the surface. The source signature signal which propagates into the earth is not the same as the geophone response signal which returns, after being filtered by the earth.

The main importance of the seismic signature is in its use to improve the quality of recorded seismic data. Since the source signature is the signal that is propagated into the earth, neglecting attenuation effects, any reflecting horizon returns the entire wavelet. A seismic record that is made up of reflections has many overlapping reflections.

Further, it is typical that the seismic sources operate at locations having topography that is at variance with the topography of other survey sites. Therefore, the energy pulses transmitted into the strata by the seismic sources are frequently at variance with one another, and the resulting reflections will correspondingly exhibit dissimilar wave form characteristics.

Deconvolution is a mathematical process for partly recompressing the stretched-out wavelets into shorter ones. The trace is processed with an operator, another trace, that, when combined with the first, has the effect of reducing repetitions in the trace. The extra legs of a wavelet are reduced or eliminated, so a reflection is not so likely to interfere with a following one. The reflections can then be better distinguished as separate events.

Signature deconvolution is a powerful tool for data enhancement. It can be used where the signature of the source has been recorded. The source signature is used to aid in the selection of the best operator. The result is a deconvolution process which produces better processed data.

OBJECTS OF THE INVENTION

It is an object of this invention to provide an apparatus well adapted for detecting seismic source signatures.

It is another object of this invention to provide a method for positioning an apparatus for the reliable detection of seismic source signature.

SUMMARY OF THE INVENTION

According to one aspect of the present invention, an apparatus comprises a tubular member having a first end, a second end, and a longitudinal axis; a first closure means positioned at the first end of the tubular member; a first geophone having a principal axis of sensitivity; means for positioning the first geophone in the tubular member so that its principal axis of sensitivity is generally parallel to the longitudinal axis of the tubular member; a second closure means positioned at the second end of the tubular member, the second closure means in combination with the first closure means for isolating the inside of the tubular member from the outside; and at least one pair of electrical conductors extending from the geophone and through the second closure means. The tubular member has a shape which renders it well adapted for lowering into a borehole and it can be sealed to form a geophone housing which is impermeable to water. Because the geophone can be isolated from its downhole environment, its performance is highly reliable and the possibility of failure caused by water is greatly reduced. Further, when the tubular member is constructed of inexpensive materials, such as polyethylene or polyvinylchloride, the device is sufficiently cheap to construct that it can be sacrificed. Where the means for positioning the geophone in the housing comprises a mass of polymeric material in which the geophone is embedded, the seismic signal received by the geophone reliably duplicates the signal in the surrounding rock formation.

According to another aspect of the present invention, a method is provided for positioning a detector for the receipt of a seismic source signature signal comprising the positioning of at least one geophone contained in a housing in a borehole in the earth; and the cementation of the housing into the borehole. Highly desirable source signature signals can be established from detection of the propagated seismic wave at a point well below the surface of the earth. Where the borehole extends through the weathered layer the geophone can be positioned in a well consolidated strata for receipt of signals in this region. Where the geophone housing is cemented to the bottom and/or walls of the borehole, the signals received by the geophone reliably duplicate the signals in the strata. Further, the orientation of the housing or the geophone it contains is not subject to unexpected change. Where a seismic source positioned adjacent the upper end of the borehole is used to propagate a seismic signal, and the signal is received without reflection by the geophone contained in the housing, a source signature signal can be established which is highly representative of the seismic signal propagated from the seismic source.

BRIEF DESCRIPTION OF THE DRAWINGS

The FIGURE is an an isometric view of an apparatus embodying certain features of the invention with portions of its exterior broken away or taken in cross-section.

DETAILED DESCRIPTION OF THE INVENTION

Figure 1:
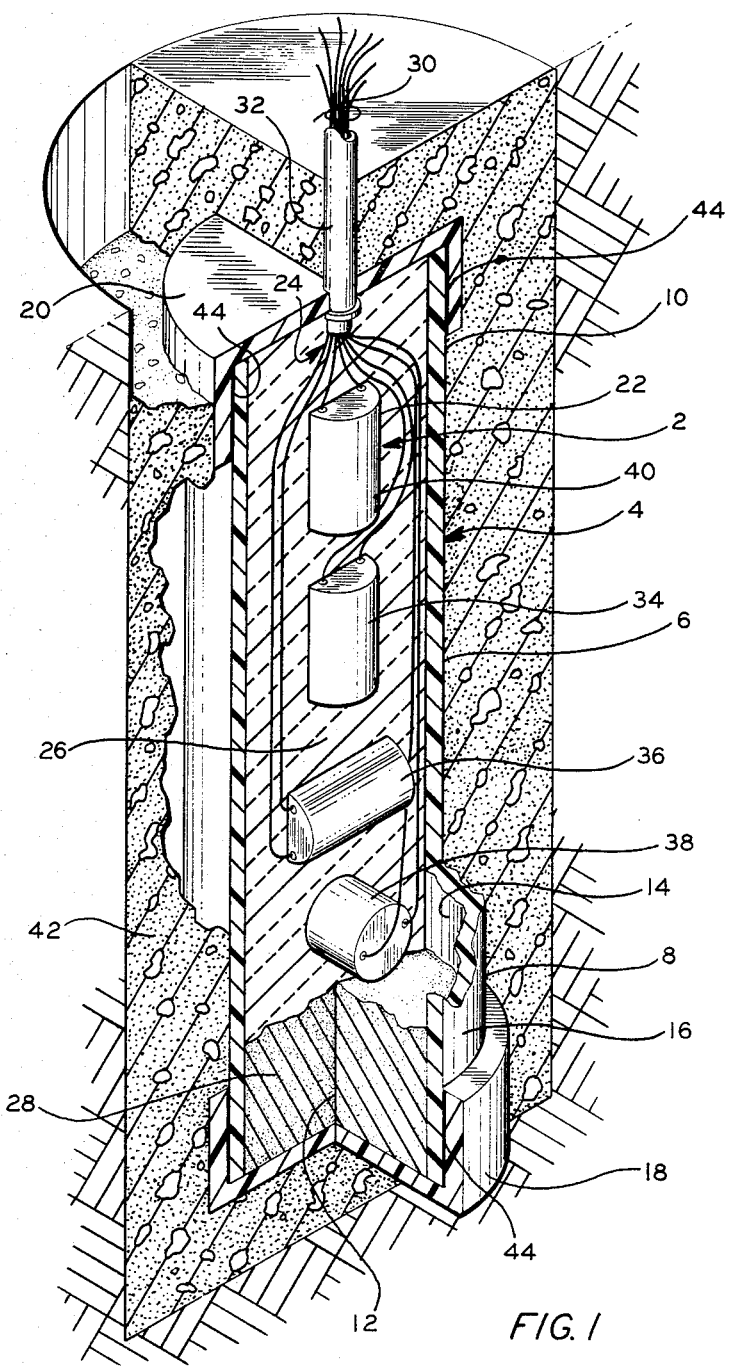

According to the invention, at least one geophone, illustratively 2, is positioned in a suitable geophone housing illustrated by the reference numeral 4. Preferably, the at least one geophone 2 is positioned with its principal axis of sensivity generally parallel to a longitudinal axis 12 of the housing. The principal axis of sensitivity of a geophone, as used herein, describes the direction in which the geophone is designed to detect motion. Normally, the axis will parallel a line between the north and south poles of the geophone magnet. Preferably, the housing 4 comprises a tubular member 6 having a first end 8, a second end 10, and a longitudinal axis 12. Preferably, the interior surface 14 and the exterior surface 16 of the tubular member are generally cylindrical in shape. A first closure means 18 is positioned at the first end of the tubular member and isolates the inside surface 14 from the outside surface 16. A second closure means 20 is positioned at the second end 10 of the tubular member 6 and isolates the interior surface 14 from the exterior surface 16 at that end. The closure means can be fastened to the tubular member by any suitable watertight means such as by threading, welding, or the like. Preferably, because of economy, the closure means 18 and 20 are cemented to the tubular member 6 with a suitable adhesive 44. This fastening method is especially preferred where the tubular member 6 and closure means 18 and 20 are formed from a thermoplastic material. For example, the parts can be formed from polyvinlchloride (PVC) or polyethylene. Components suitably utilized for constructing the housing 4 are commercially available as pipe and end caps. PVC is the material of choice because it has been used with good results.

Geophones such as 2 are well known and are commercially available. Generally speaking, each geophone 2 comprises a tubular housing 22 closed at its ends to present a generally cylindrical appearance. A generally cylindrical magnet is fixedly mounted axially within the tubular housing 22. A tubular coil is resiliently mounted in the annulus in between the magnet and the housing. Vibrations received by the geophone cause relative movement between the magnet and the coil. The coil, because of its inertia, attempts to remain stationary. An electrical signal representative of a component of the seismic vibration is generated due to the movement between the magnet and the coil and can be transmitted to suitable processing equipment via at least one pair of electrical conductors 24 which extend from the geophone 2 and through the second closure means 20.

Preferably, the geophone 2 is postioned in the housing 4 by a suitable means such as by being embedded in a mass of polymeric material. A mass of polymeric material which has been used with good results comprises epoxy cement. Scotchcast brand epoxy cement, available from 3M Co. of St. Paul, Minn., has been used with good results. During fabrication, the geophone can be positioned for encasement in the polymeric material by wires, for example. It is further preferable in accordance with the invention that a second material be positioned in a lower portion 28 of the tubular member. The second material preferably has a density greater than that of the borehole fluids to insure that the housing is suspended during placement in a borehole in a true vertical line like a plumb bob. Where a vertical geophone is positioned in the tubular housing with its principal axis of sensitivity coinciding with or parallel to the longitudinal axis of the tubular housing, the suspension points should be chosen so that the vertical axis of the plumb bob coincides with the longitudinal axis of the housing. Also, it is desirable that the overall apparatus exhibit a density greater than that of borehole fluids, so that it will sink to the bottom of the borehole. In the illustrated embodiment, the second material comprises sand because it is economical to use and is readily available. Other material, such as lead shot will perform equally as well. Thus, in the preferred embodiment, the housing 4 is completely filled by a polymeric material containing at least one geophone in its upper portion and a second material having a greater density than the borehole fluids in its lower portion. The importance of completely filling the apparatus is to discourage water infiltration when the apparatus is deployed.

In use, the apparatus of the present invention is positioned in a borehole in the earth by means 42 for rigidly positioning a tubular member in a borehole, for example, a mass of cement which partially fills the borehole. Generally, the device will be positioned adjacent a lower portion of the borehole and will frequently be at a depth of between about 100 and 400 feet (31 to about 122 meters) below the surface of the earth. Preferably, the device will be anchored in cured plaster of paris or the like and within a consolidated geological formation although useful information can be obtained when the device is positioned in unconsolidated strata. Cementation of the device to the bottom and/or sides of the borehole greatly mitigates dampening which could occur if other means of coupling the geophones to the formation were utilized.

The device is positioned in the borehole as follows. After the borehole has been drilled to the desired depth, the device is lowered into the borehole to its desired final position, usually adjacent the bottom of the borehole. Where the borehole is relatively shallow, such as being only a few hundred feet in depth and/or the device has been constructed so as to be of relatively light weight, it can be manually lowered into the borehole, suspended from cable 32 which preferably includes conductors 30. Where the housing is formed from a tubular member, the cable is attached so that the tube hangs vertically, preferably by being affixed to the center of endcap 20. While tension is maintained on the cable, cement is poured over the device until it is embedded. Preferably, the cement utilized is of a fast drying type, such as plaster of Paris. Where the borehole contains water, the cement selected should sink and cure underwater. Cal-Seal ® cement, commercially available from U.S. Gypsum Co. has been employed with good results. When the cement has cured, the apparatus will be embedded in a mass of cement which is contained in a borehole in the earth. The borehole is then preferably backfilled with dirt or cuttings to eliminate waves traveling down the borehole.

In a preferred embodiment, the apparatus of the invention includes a first, vertical, geophone 34 positioned in the tubular member 6 such that its principal axis of sensitivity is generally parallel to the longitudinal axis of the tubular member, a second, horizontal, geophone 36 embedded in the polymeric material with its principal axis of sensitivity at about a right angle with the principal axis of sensitivity of the first geophone 34; and a third, horizontal, geophone 38 completely embedded in the polymeric material with its principal axis of sensitivity at about a right angle with the principal axis of sensitivity of the first geophone and at about a right angle with the principal axis of sensivity of the second geophone. A pair of wire leads are attached to each of the three geophones for conveying their respective signals to uphole processing equipment. A vertical geophone 40, identical to geophone 34, is included redundantly for, as the vertical signal component is important and should geophone 34 fail, the assembly cannot be retrieved for repair.

According to another aspect of the present invention, a method is provided comprising the positioning and cementing of at least one geophone in a geophone housing in a borehole in the earth. Preferably, the geophone and housing are as described hereinabove, although the method is useful with any housing containing an orthogonal set or subset of geophones.

The apparatus is preferably employed to transduce a seismic signal into an electrical signal for the facilitation of further processing. According to this aspect of the invention, a seismic source is positioned in the vicinity of or adjacent to the upper end of the borehole with offsets variable from about 10 ft. to about 1000 ft. (3 m to 305 m), preferably about 200 ft. (61 m). The source utilized can be any desired, for example, impulsive types including explosives or weight drops and encoded sources such as vibrators. The source is actuated, and a seismic signal is propagated therefrom. It is received by at least one geophone contained within the apparatus. Preferably, to derive a source signature, the unreflected signal is received by at least one geophone. In response to the thus received seismic signal, each of the geophones establish a signal representative of the component of the seismic signal coinciding with the principal axis of sensivity of the respective geophone. These signals are transmitted via conductors 30 to suitable processing equipment and a source signature signal representative of the seismic signal propagated from the seismic source can be established.

While certain preferred embodiments of the invention have been described, it is not to be construed as so limited, except to the extent that such limitations are found in the claims.

That which is claimed is:

1. An apparatus useful in down hole detection of seismic waves comprising:
    (a) a thermoplastic, tubular member having a first end, a second end, and a longitudinal axis;
    (b) a first closure means positioned at the first end of the thermoplastic, tubular member, isolating the inside of the tubular member from the outside;
    (c) first geophone having a principal axis of sensitivity positioned so that its principal axis of sensitivity is generally parallel to the longitudinal axis of the tubular member;
    (d) a second closure means positioned at the second end of the thermoplastic, tubular member and isolating the inside of the tubular member from the outside;
    (e) a first pair of wire leads extending from the first geophone and through the second closure means;
    (f) a second geophone having a principal axis of sensitivity positioned with its principal axis of sensitivity at about a right angle with the principal axis of sensitivity of the first geophone;
    (g) a second pair of wire leads extending from the second geophone and through the second closure means;
    (h) a third geophone having a principal axis of sensitivity positioned with its principal axis of sensitivity at about a right angle with the principal axis of sensitivity of the first geophone and the principal axis of sensitivity of the second geophone;
    (i) a third pair of wire leads extending from the third geophone and through the second closure means;
    (j) a mass of polymeric material surrounding each of the first, second and third geophones, the geophones being embedded in said polymeric material and
    (k) a mass of a second material positioned in a lower portion of the thermoplastic, tubular member, said second material having a density greater than that of the anticipated borehole fluids.

2. Apparatus as in claim 1 wherein the apparatus is rigidly positioned in a borehole in the earth.

3. Apparatus as in claim 2 wherein the apparatus is embedded in a mass of cement contained in a borehole in the earth.

4. A method comprising:
    (a) positioning an apparatus of claim 1 in a borehole;
    (b) cementing the apparatus in position in the borehole;
    (c) positioning a seismic source adjacent the upper end of the borehole;
    (d) propagating a seismic signal from the seismic source;
    (e) receiving the seismic signal without reflection at the at least one geophone; and
    (f) establishing, in response to the thus received signal, a source signature signal representative of the seismic signal propagated from the seismic source.

5. A method as in claim 4 wherein the source signature signal is derived from signals produced by each of the three geophones.

* * * * *